United States Patent [19]
Nonis et al.

[11] 3,853,570
[45] Dec. 10, 1974

[54] CEMENT COMPOSITION

[76] Inventors: Victor Nonis, Roundtree Mills Rd.;
Italo Nonis, 4 Tothill Rd., both of
Etobicoke, Ontario, Canada

[22] Filed: Nov. 27, 1972

[21] Appl. No.: 309,743

[52] U.S. Cl. ................................................. 106/97
[51] Int. Cl. ............................................. C04b 7/02
[58] Field of Search ....................................... 106/97

[56] References Cited
UNITED STATES PATENTS
2,758,033    8/1956    Burney et al. ........................ 106/97
3,366,720    1/1968    Burger ................................. 106/97

*Primary Examiner*—J. Poer
*Attorney, Agent, or Firm*—Ridout & Maybee

[57] ABSTRACT

A cement composition for use in producing marbly and like decorative surfaces comprises white Portland cement, marble dust fines, and dolomite aggregate, the dolomite aggregate having a catalytic action which greatly reduces the setting time and results in an end product of exceptional hardness.

4 Claims, No Drawings

CEMENT COMPOSITION

This invention relates to hydraulic cement compositions, more particularly for use in the production of marbly and like decorative surfaces having a very smooth finish.

For the production of marbly cement surfaces it is known to use a cement composition comprising white Portland cement and marble dust fines, i.e., powdered marble, with or without the addition of inert fillers. Such a composition is frequently used in the surfacing of swimming pools. The composition is mixed with water, a catalyst and a binder usually being added, and is applied to the surface to be covered as a wet mortar. After application to the surface the mortar is allowed to set and harden, suitable precautions being taken to avoid deterioration of the surface during the curing period. One of the difficulties of using a calciferous cement, and particularly a cement which contains a high proportion of marble, is that the setting time varies greatly for different jobs according to temperature and humidity conditions. In certain climates this difficulty considerably reduces the number of days per year on which the cement can be used satisfactorily. It is known to use calcium chloride flakes as a catalyst to accelerate the setting of cement, but calcium chloride has two serious limitations. In the first place, calcium chloride is very deliquescent and so can only be used when the relative humidity is low. In the second place, the use of calcium chloride in excess weakens the end product.

According to the present invention, there is provided an improved cement composition which comprises white Portland cement, marble dust fines, and dolomite aggregate. The incorporation of dolomite aggregate, which contains at least 40 percent by weight magnesium carbonate, and typically 44 percent by weight magnesium carbonate and about 55 percent by weight calcium carbonate, results in an end product having unexpected strength. The high strength of the end product is believed to result from the relatively high proportion of magnesium carbonate in the mix.

Not only does the use of dolomite aggregate result in an end product of increased strength, but the setting time is greatly reduced. Indeed it is found that by varying the ratio of dolomite aggregate to marble dust fines, one can produce a cement composition having a chosen setting time for any one of a wide range of conditions.

The invention also provides a two-part cement composition consisting of first and second parts adapted to be mixed with water. The first part, Part A, consists of white Portland cement, marble dust fines, and dolomite aggregate. The second part, Part B, consists of asbestos shorts, a catalyst such as calcium chloride with acrylic resin and a liquid carrier, and a liquid polymeric binder.

Part A of the cement composition essentially comprises 15 to 35 percent by volume of marble dust fines, 25 to 45 percent by volume of dolomite aggregate, the remainder being Portland cement. The proportions may be varied within these ranges to suit different climatic conditions. For some purposes Part A of the composition will comprise 20 to 35 percent by volume of marble dust fines, 25 to 40 percent by volume of dolomite aggregate, the remainder being white Portland cement and constituting about 40 percent of the composition. However, when the composition is to be used for stucco, Part A of the composition preferably comprises 15 to 20 percent by volume of marble dust fines, 40 to 45 percent by volume of dolomite aggregate, the remainder being white Portland cement and constituting about 40 percent of the composition.

Examples of cement compositions in accordance with the invention will now be described, the compositions being given as two-part compositions in which the first and second parts are adapted to be mixed together in the presence of water.

Example 1

| Part A | White Portland cement | 40% by volume |
|---|---|---|
| | Marble dust fines | 35% by volume |
| | Dolomite aggregate | 25% by volume |
| Part B | Asbestos shoots | 90% by volume |
| | Catalyst | about 5% by volume |
| | Polymeric binder | about 5% by volume |

The binder may be the polymeric binder sold under the trade mark "Finestone." Alternatively, there is available on the market a composition sold under the trade mark "Advanquotite," which includes both catalyst and binder.

The composition of Example 1 is intended for use on clear sunny warm days. The component mixes, Part A and Part B are mixed together in sufficient water to make a workable mix, the proportions by volume being 95 percent and 5 percent respectively. Preferably Part B of the composition is added to the water first, but this is not necessary. The setting time for the cement, given a clear day with low humidity and a temperature of 78° F, is about 3 hours, the hardening time being about 5 hours.

Example 2

| Part A | White Portland cement | 40% by volume |
|---|---|---|
| | Marble dust fines | 25% by volume |
| | Dolomite aggregate | 35% by volume |
| Part B | Asbestos shoots | 90% by volume |
| | Catalyst | 5% by volume |
| | Binder | 5% by volume |

The composition of Example 2 is intended for use on clear sunny days in which the temperature is in the range 60° to 78° F. Parts A and B are mixed with water as in the previous example, and the resultant cement has a setting time of about 3 hours and a hardening time of about 5 hours.

Example 3

| Part A | White Portland cement | 40% by volume |
|---|---|---|
| | Marble dust fines | 20% by volume |
| | Dolomite aggregate | 40% by volume |
| Part B | Asbestos shoots | 90% by volume |
| | Catalyst | 5% by volume |
| | Binder | 5% by volume |

The composition of Example 3 is intended for use on warm overcast days in which the humidity is high. The components are mixed with water as in the preceding examples, but in this case are mixed in the proportions 90 percent Part A by volume to 10 percent Part B by volume. In this case the setting time and hardening time depend upon the humidity level. For a humidity of 80 percent, the setting time is found to be about 3 hours and the hardening time about 4½ to 5 hours. For a humidity of 90 percent, the setting time is found to be about 3½ hours and the hardening time about 6 hours. For a humidity of 100 percent the setting time is about 4 hours and the hardening time rather more than 6 hours.

It is apparent that the use of the dolomite aggregate greatly accelerates the setting time of the cement, as compared with other cements containing marble dust fines, the setting time of which is typically 5 or 6 hours even under the most favourable climatic conditions.

A two-part cement composition in accordance with the present invention may be used advantageously for stucco. A particularly suitable composition for this purpose is essentially the same as that of Example 3 except that the proportions of the ingredients may be changed by increasing the quantity of dolomite aggregate and reducing the quantity of marble dust fines. Thus, Part A of the composition may have the following formula:

White Portland cement — about 40 percent by volume
Marble dust fines — 15 – 20 percent by volume
Dolomite aggregate — 40 – 45 percent by volume The ingredients of Part A are in powdered form. In the above examples, the dolomite aggregate has the following particle size distribution:
−10 to −18 mesh: 90 percent
−20 to −40 mesh: 10 percent The marble dust fines have the following particle size distribution:
−16 to −50 mesh: 70 percent
−50 to −200 mesh: 30 percent

What we claim as our invention is:

1. A dry cement composition which comprises 15 to 35 percent by volume of marble dust fines, 25 to 45 percent by volume of dolomite aggregate, the remainder being white Portland cement.

2. A dry cement composition according to claim 1, which comprises 20 to 35 percent by volume of marble dust fines, 25 to 40 percent by volume of dolomite aggregate, the remainder being white Portland cement and constituting about 40 percent of the composition.

3. A dry cement composition according to claim 1, which comprises 15 to 20 percent by volume of marble dust fines, 40 to 45 percent by volume of dolomite aggregate, the remainder being white Portland cement and constituting about 40 percent of the composition.

4. A dry cement composition according to claim 1, in which the dolomite aggregate is smaller than −10 mesh and the marble dust fines are smaller than −16 mesh.

* * * * *